July 10, 1962  K. KOBER  3,043,601
STEERING MECHANISM
Original Filed May 3, 1961  2 Sheets-Sheet 1
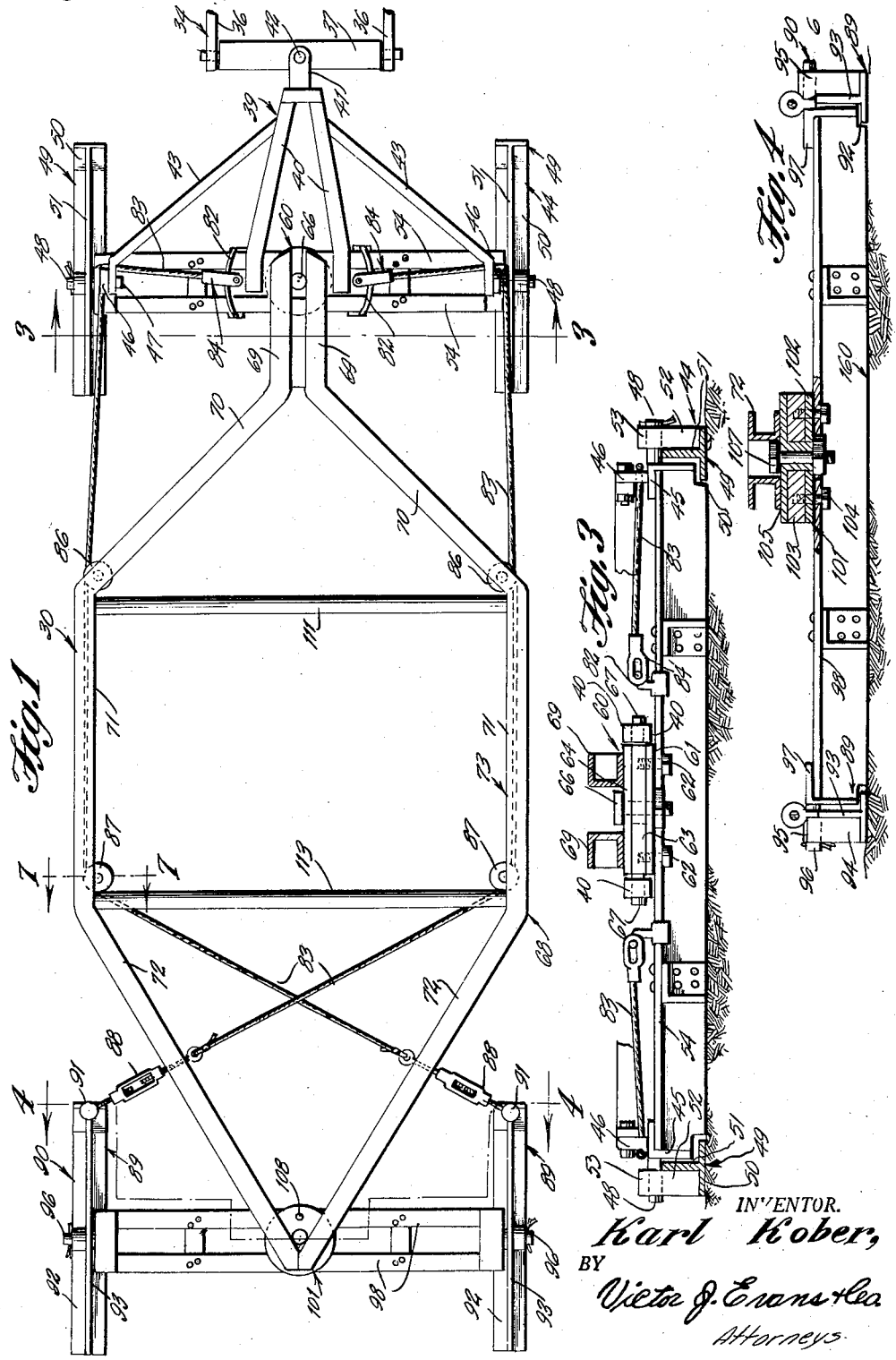
INVENTOR.
Karl Kober,
BY
Victor J. Evans & Co.
Attorneys

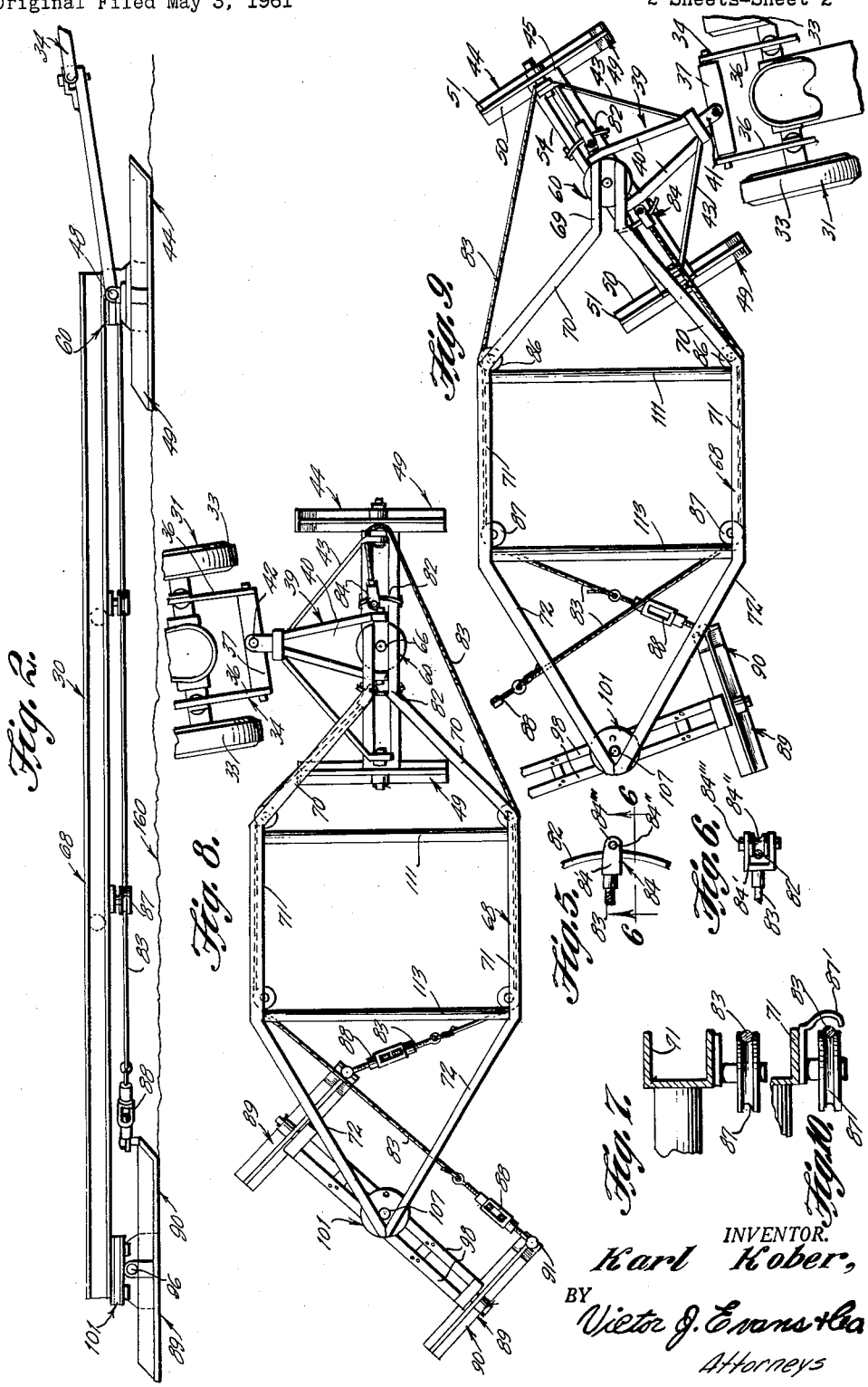

United States Patent Office 3,043,601
Patented July 10, 1962

3,043,601
STEERING MECHANISM
Karl Kober, Park City, Mont.
Original application May 3, 1961, Ser. No. 107,528. Divided and this application May 12, 1961, Ser. No. 109,726
4 Claims. (Cl. 280—15)

This invention relates to a land leveler and in particular to a steering mechanism for such a land leveler.

The object of the present invention is to provide an improved steering mechanism for a land leveler wherein the leveler will have increased maneuverability so that as ground is being leveled or worked, and with the leveler being pulled behind a towing vehicle such as a tractor, turning movement of the land leveler can be accomplished in a highly advantageous and efficient manner due to the improved construction of the steering mechanism of the present invention.

The present application is a divisional application of a copending patent application on a leveler which is identified by Serial No. 107,528, and which was filed in the U.S. Patent Office on May 3, 1961, and the present invention is directed to the steering mechanism per se, while the remaining features of the leveler are set forth in the co-pending patent application.

A further object of the present invention is to provide an improved steering mechanism for a land leveler wherein a short turning principle is embodied in the land leveler due to the herein set forth steering mechanism, and wherein the steering mechanism includes a pair of cables which operate on a give and take principle and wherein the present invention insures that the leveler can be conveniently maneuvered or turned during the use or operation thereof.

With these and other objects in view, the present invention consists of a construction, arrangement and combination of the various parts of the device, whereby the objects contemplated are attained, and hereinafter more fully set forth, pointed out in the claims, and illustrated in the accompanying drawings, in which:

FIGURE 1 is a top plan view illustrating the steering mechanism for the land leveler, constructed according to the present invention.

FIGURE 2 is a side elevational view with the parts in the position of FIGURE 1.

FIGURE 3 is a sectional view taken on the line 3—3 of FIGURE 1.

FIGURE 4 is a sectional view taken on the line 4—4 of FIGURE 1.

FIGURE 5 is a fragmentary sectional view illustrating the coupling for the front end of one of the steering cables.

FIGURE 6 is a sectional view taken on the line 6—6 of FIGURE 5.

FIGURE 7 is a sectional view taken on the line 7—7 of FIGURE 1.

FIGURE 8 is a schematic top plan view illustrating the position of the parts for a left turn.

FIGURE 9 is a view similar to FIGURE 8, but illustrating a right turn, and with parts broken away.

FIGURE 10 is a fragmentary sectional view illustrating a modification showing a bracket or retaining member for helping to hold the steering cables in place on the rollers or pulleys.

Referring in detail to the drawings, there is set forth only that portion of the present invention which relate to the steering mechanism since the remaining portions of the leveler have been described and illustrated in detail in co-pending application Serial No. 107,528. In general, similar reference numerals are used in the present application to identify corresponding parts for the present application as well as for the co-pending or parent application on the leveler, and a detailed description of those operating parts which do not pertain to the steering mechanism is omitted from the present application since only the steering mechanism is described and illustrated and claimed in detail herein.

As shown in the drawings, the numeral 30 indicates the land leveler which is adapted to be used for leveling ground or land, or for various types of working or smoothing purposes, and the land leveler 30 is adapted to be pulled or towed behind a vehicle such as a conventional tractor 31 which includes the usual rear wheels 33, and the tractor 31 is adapted to include a conventional lift mechanism 34 which may be hydraulically actuated, and the lift mechanism 34 includes the usual arms 36 which are connected at their rear ends by a crosspiece 37. The numeral 39 indicates a hitch for the land leveler, and the hitch 39 includes a pair of side arms 40 which are suitably connected together, and a tongue 41 on the front end of a hitch 39 is swivelly or pivotally connected to the crosspiece 37 as for example by means of a pin 42. The numeral 43 designates each of a pair of braces which have their front ends secured to the side elements 40 in any suitable manner.

The land leveler 30 embodies a front truck unit or front runner or sled section which is indicated generally by the numeral 44, and it will be seen that the front truck unit 44 includes a pair of horizontally disposed short angle irons 45 that are horizontally disposed, and upstanding pegs or lugs 46 are secured to or formed integral with the angle irons 45, for a purpose to be later described. The rear ends of the braces 43 are pivotally or swivelly connected to the pegs 46 by means of pivot pins 47. The front runner section 44 includes a pair of spaced parallel horizontally disposed runners 49 which each have an inverted T-shape in cross section so that it will be seen that each of the runners 49 includes an upstanding or vertical section 51 as well as a horizontal section 50, and brackets or blocks 52 are suitably secured to the runners 49, there being bearings 53 supported by the blocks 52, and these bearings 53 swivelly receive or engage trunnions 48 that are suitably affixed to the angle irons 45. The front runner section 44 further includes a pair of horizontally disposed spaced parallel bars 54 which have their end portions suitably secured to the angle irons 45, and as described in the co-pending patent application, a smoothing blade is adapted to be mounted below the bars 54 of the front truck unit 44.

The numeral 60 indicates a front turn table which embodies a lower plate 61 that is secured as at 62 to the bars 54, and the front turn table 60 further includes an intermediate body piece 63 that is arranged above the lower plate 61 and which is secured to the lower plate 61, and there is provided an upper plate 64 that is swivelly supported above the body piece 63, and this swivel action of the upper plate 64 can take place due to the provision of a king pin 66. Diametrically opposed trunnions 67 are secured to opposite portions of the body piece 63, and the rear ends of the side elements 40 are swivelly or pivotally connected to the trunnions 67.

There is further provided a main frame which is indicated generally by the numeral 68, and the main frame 68 of the leveler consists of a pair of generally similar side members which are channel shaped in cross section, and these side members are indicated generally by the numeral 73 and the side members are arranged so as to define spaced parallel front or first portions 69 as well as angularly arranged second portions 70, and the main frame 68 further includes spaced parallel horizontally disposed third portions 71 as well as angularly arranged fourth portions 72, and the front or first portions 69 are adapted to be secured as by welding to the upper plate 64 of the turn table 60, as shown in FIGURE 3.

The steering mechanism for the leveler includes a pair of arcuate brackets or quadrants 82 that are suitably affixed to the bars 54, and the numeral 83 designates each of a pair of steering cables which are swivelly connected to the brackets 82 by means of couplings 84, and as shown in FIGURES 5 and 6 for example, the couplings 84 comprise mounting members 84' which have rollers 84" journaled therein as for example by means of pins or studs 84'". Portions of the cables 83 extend below the rear ends of the braces 43, and portions of the cables 83 extend around the pegs 46, and these cables engage pulleys 86 and 87 which are suitably connected to the main frame 68, and as shown in FIGURE 1, the rear portions of the cables 83 are arranged in criss cross relation with respect to each other, and there is provided adjustable turn buckle assemblies 88 in the rear sections of the cables 83, and the rear ends of the cables 83 are anchored to the front ends of rear runners 89 that form part of a back or rear runner section or truck unit 90. The cables 83 are arranged so that a portion thereof extends below the rear ends of the braces 43, and portions of these cables 83 are extended around the pegs 46, so that a cable pulling shoulder arrangement is provided. As later describd in this application, the front truck 49 of the leveler can be turned ninety degrees while the rear truck 90 is turned about fifty degrees. The purpose of the quadrants or brackets 82 is to insure that there will be maintained a central cable hook-up after the cable 83 is free from its corresponding peg 46 in a straight line of the frame pulley such as the pulley 86 to the front truck master pivot after the front truck 44 is turned more than fifty degrees for short turns.

The rear runner section or truck unit 90 includes the runners 89 which each have the generally inverted T-shape and wherein each runner 89 embodies a horizontally disposed lower section 92 as well as an upstanding intermediate section 93, and brackets or blocks 94 are suitably secured to the runners 89, and the blocks 94 serve as a support for the bearings 95 that swivelly engage trunnions 96 which project outwardly from short angle irons 97, and a pair of spaced parallel horizontally disposed bars 98 extend between the angle irons 97 and are secured thereto in any suitable manner.

The numeral 101 indicates a rear turn table which includes a lower plate 102 as well as an intermediate base piece 103 and the parts 102 and 103 are adapted to be secured to the bars 98 as for example by means of securing elements 104, and the turn table 101 further includes an upper plate 105 that is swivelly arranged above the body piece 103, and the upper plate 105 is swivelly supported by means of a king pin 107. The rearwardly disposed fourth portions 72 of the main frame 68 are adapted to be secured as by welding to the upper surface of the top plate 105. The numeral 108 indicates a removable lock pin which is adapted to selectively engage apertures or openings in the rear turn table 101 for selectively preventing relative rotation between parts such as the parts 105 and 103.

In FIGURE 1 the numerals 111 and 113 indicates spaced parallel horizontally disposed tubular support members which extend between the third portions 71 of the frame 68 and which are secured thereto as by welding.

In FIGURE 10 the numeral 87' indicates a modification wherein there is provided the bracket or holding member 87' to help hold in place a steering cable 83 on a roller or pulley such as the pulley 87 or 86. Such a retaining member 87' can be used contiguous to and in conjunction with each of the pulleys such as the pulleys 86 or 87.

In FIGURES 2 and 4 the numeral 160 indicates the ground being leveled or worked by a leveler equipped with the steering mechanism of the present invention.

It will be seen that according to the present invention there has been provided a steering mechanism which is adapted to be used with a leveler such as the land leveler shown and described in detail in my co-pending patent application, and with the steering mechanism of the present invention, the leveler can be conveniently turned or maneuvered so that for example as shown in FIGURE 8 with the leveler mounted behind a towing vehicle or tractor 31, a left turn can be readily accomplished, or as shown in FIGURE 9 a right turn can be readily accomplished or made. It is to be noted that when the leveler is turned as for example when a left turn is being made as shown in FIGURE 8, the front truck unit 44 will turn to the left in the same direction as the tractor 31, but the rear truck unit 90 will turn in the opposite direction from the front truck unit 44. This is due to the provision of the pair of cables 83 which operate on the give and take principle, together with the front and rear turn tables 60 and 101 which swivelly or pivotally connect the front and rear truck units to the adjacent end portions of the main frame 68. In addition it is to be noted that when the leveler is being turned, the rear truck unit does not rotate or swivel in as wide an arc as the front truck unit.

With reference to FIGURE 9, there is illustrated schematically the leveler being maneuvered through a right turn, and in FIGURE 9 it will be seen that the truck 31 is turned to the right so as to cause the front truck unit 44 to turn to the right due to the provision of the hitch 39 which connects the front truck unit 44 to the lift mechanism 34 of the tractor 31. During this right turn as shown in FIGURE 9, the rear truck unit 90 will be turned to the left in a direction opposite to the direction of turning of the front truck unit 44.

The pair of cables 83 have their front portions swivelly coupled as at 84 to the arcuate brackets or quadrants 82 on the front truck unit 44, and portions of these cables 83 extend below the rear end of the braces 43 and are extended around the upstanding pegs 46, and these cables 83 are arranged in engagement with pulleys such as the pulleys 86 and 87 on the main frame 68, and the rear portions of the cables criss cross each other and have turn buckles 88 thereon, and the rear ends of the cables are anchored as at 91 to the front ends of the runners 89 of the rear truck unit 90. This construction is such that for example on a left turn being made as shown in FIGURE 8, the cable 83 shown in the lower portion of FIGURE 8 will have tension applied therto so as to pull on the corresponding runner 89 of the rear truck unit 90, and at the same time the other cable will be slackened so as to permit the opposite rear runner 89 to move in the proper direction in order to accomplish the desired turning movement in the proper manner.

The coupling 84 may consist of a mounting member 84' that is suitably affixed to an end of the cable 83, and a roller 84" is journaled in the mounting member 84' as for example by means of a pin or stud 84'", and this roller 84" which is provided with an annular groove therein, is adapted to swivelly engage the arcuate quadrant or bracket 82 so that the coupling 84 can pivot or move back and fourth on the quadrant 82 as the turning movement takes place.

The retaining member 87' shown in FIGURE 10 may be used in conjunction with a pulley such as the pulley 87 so as to help retain or maintain the cable 83 in engagement with a pulley such as the pulley 87, and a similar retaining member can be used for the other pulleys such as the pulleys 86. These pulleys 86 and 87 may be supported by suitable studs or pins which are suitably connected to the main frame 68.

As previously stated the steering mechanism of the present invention is adapted to be used with a land leveler that includes scraping blades and other elements or accessories which are shown and described in detail in my co-pending patent application, and the leveler is adapted to be used for scraping or leveling uneven surfaces in ground, and the steering mechanism of the present invention facilitates the turning of the leveler as for example when it is being pulled or towed behind a vehicle such as a tractor. When the leveler turns, the front runner section turns in an opposite direction from the rear runner section, and also the rear runner section does not turn in as wide an arc as the front runner section. As shown in FIGURES 8 and 9, when the leveler is making a turn, one cable lengthens and the other shortens and this is the reason why the rear runner section moves in the desired manner. The portions of the cable 83 which are contiguous to the portions 71 of the main frame 68 are arranged in spaced parallel relation with respect to each other, and the rear ends of the cables 83 criss cross as shown in FIGURE 1.

The leveler can be maneuvered and turned in a minimum amount of space, and the steering mechanism is adapted to be used with a true plane automatic level to accomplish the desired result. The front ends of the cable pulleys are coupled as at 84 to the quadrants 82, and the cables 83 extend below the rear ends of the braces 43 and around the upstanding pegs 46, and the pegs 46 are so placed relative to the master pivot so that the forward pull from the cables while turning will equal the required pull for a lesser turn of the rear truck which is not as great as the maximum turn of the front truck. Sufficient clearance is permitted for the cable to operate freely by placing the quadrant as low as possible relative to the frame and also making the pegs and fifth wheel or turn table truck plates of sufficient height to permit this action to take place.

It is to be understood that the automatic land leveler equipped with the steering mechanism of the present invention operates on a true plane principle so that the blade in the center of the implement which does the scarfing or dirt moving does not move its position below, and does not raise its position above the plane of the leveler, and the leveler is adapted to be used for moving high bumps in ground surfaces, or filling in depressions in the ground so as to leave a smooth surface as the leveler is pulled across a field or the like whereby irregularities in the ground will be smooth, so that land can be leveled for any desired purpose as for example in connection with irrigation, landscaping purposes or the like. The steering mechanism insures that the leveler is highly maneuverable and the front and rear turn tables generally have the same construction except that the rear turn table is adapted to utilize a locking pin 108 whereby the rear turn table 101 can be locked when desired or required.

The present invention is such that a short turning principle is provided for, and the front ends of the cables 83 are attached to the quadrants 82 with the rolling clevis 84, and these cables are strung around the pull hitch brace pegs 46, and the cables engage the pulleys 86 and 87 and are attached to the front ends of the runners 89 as at 91. The cables 83 operate on a give and take principle and with this arrangement, as the front truck 44 is turned ninety degrees to the left for example as shown in FIGURE 8, the rear sled truck 90 will have turned a maximum of about fifty degrees which is sufficient. When the front truck is turned as for example as shown in FIGURE 8, the brace peg 46 which holds the cable 83, acts as a pulling point or shoulder on the front truck to pull the rear truck in the proper direction, and a brace peg 46 will release a corresponding cable 83 at a suitable position, such as about fifty-eight degrees of a turn by the front truck, and the cable will be given sufficient freedom to pull back to its proper position. After the level turn has been completed, and the leveler is again being pulled straight, the brace pegs 46 will again catch the cables so that a rear truck will be pulled straight with the front truck.

It is to be understood that the parts can be made of any suitable material and in different shapes or sizes.

For the purpose of exemplification a particular embodiment of the invention has been shown, and described according to the best present understanding thereof, however, it will be apparent to those skilled in the art, that many changes and modifications can be made therein without departing from the true spirit of the invention.

What is claimed is:

1. A leveler comprising a main frame, front and rear sled runner truck units arranged adjacent the front and rear portions of the main frame, front and rear turntables swivelly connecting said truck units to said main frame, a hitch connected to said front turn table, braces secured to said hitch, upstanding pegs on said front truck unit, a pair of brackets affixed to said front truck unit, a pair of cables having their front portions swivelly connected to said brackets, and said cables having portions thereof extending below the rear ends of said braces and around said pegs, pulleys on said main frame engaged by said cables, the rear portions of said cables being arranged in criss cross relation with respect to each other and being anchored to the front portions of the rear truck unit.

2. A leveler comprising a main frame, front and rear sled runner truck units arranged adjacent the front and rear portions of said main frame, front and rear turn tables swivelly connecting said truck units to said main frame, a hitch connected to said front turn table, braces secured to said hitch, upstanding pegs on said front truck unit, a pair of brackets affixed to said front truck unit, a pair of cables having their front portions swivelly connected to said brackets, and said cables having portions thereof extending below the rear ends of said braces and said cables extending around said pegs, pulleys on said main frame engaged by said cables, the rear portions of said cables being arranged in criss cross relation with respect to each other and being anchored to front portions of the rear truck unit, adjustable turn buckles in the rear portions of the cables, and wherein when the leveler turns, the front and rear truck units turn in opposite directions relative to each other, and wherein the pair of cables operate on a give and take principle, and wherein the rear truck unit turns through less than an arc than the front truck unit.

3. In a device of the character described, a tractor including a rearwardly arranged lift mechanism embodying spaced apart arms having their rear end portions interconnected by a crosspiece, a hitch including a pair of side elements joined together, and said hitch having an offset tongue on the front portion thereof pivotally connected to said crosspiece, a pair of angularly arranged braces having their front ends secured to said side elements; a front truck unit comprising a pair of short angle irons having upstanding pegs affixed thereto, the rear ends of said braces being pivotally connected to said pegs, said front truck unit further including a pair of spaced parallel horizontally disposed runners each having an inverted T-shape so that each runner includes a vertically disposed section and a horizontally disposed section, blocks secured to said runners and said blocks having bearings thereon, trunnions connected to said angle irons and swivelly engaging said bearings, said front truck unit further including horizontally disposed spaced parallel bars having their ends secured to said angle irons, a front turn table including a lower plate secured to said bars, an intermediate body piece mounted on and affixed to said lower plate, an upper plate pivotally mounted above said body piece, diametrically opposed trunnions affixed to said body piece and said last named trunnions having the rear ends of said side elements swivelly connected thereto; the main frame including a pair of side members channel shape in configuration and said side members being shaped to include spaced parallel forwardly disposed first portions that are fixedly secured to the upper plate of said turn table, angularly arranged second portions arranged rearwardly of said first portions, spaced parallel third portions having angularly arranged fourth portions arranged rearwardly with respect thereto, arcuate brackets affixed to the bars of said front truck unit, a pair of cables having mounting members connected to the front portions thereof, rollers journaled in said mounting members, and swivelly engaging said brackets, said cables extending below the rear ends of said braces and extending around the pegs on said front truck unit, rear portions of the cables being arranged in criss cross relation with respect to each other, pulleys on said main frame engaged by said cables; a rear truck unit comprising a pair of spaced parallel runners having anchor pins on their front ends which have the rear ends of said cables connected thereto, said rear truck unit including a pair of horizontally disposed spaced parallel bars, a rear turn table including a lower plate and an intermediate base piece affixed to said last named bars, an upper plate swivelly supported above said last named base piece, and the fourth portions of said main frame being secured to said last named upper plate.

4. In a leveler, a hitch including a pair of side elements, a pair of angularly arranged braces having their front ends secured to said side elements; a front truck unit having upstanding pegs affixed thereto, the rear ends of said braces being pivotally connected to said pegs, said front truck unit further including a pair of spaced apart runners, a front turn table mounted on said front truck unit and said front turn table including trunnions which have the rear ends of the side elements swivelling connected thereto; a main frame including a pair of side members shaped to include forwardly arranged first portions that are connected to said turn table, said main frame further including angularly arranged second portions positioned rearwardly of the first portions, spaced parallel third portions having angularly arranged fourth portions arranged rearwardly with respect thereto arcuate brackets affixed to said front truck unit, a pair of cables having their front ends swivelly connected to said brackets, the rear portions of the cables being arranged in criss cross relation with respect to each other, pulleys on said main frame engaged by said cables; a rear truck unit comprising a pair of spaced apart runners having anchor pins on their front ends connected to the rear ends of the cables, and a rear turn table swivelly connecting the fourth portions of the main frame to the rear truck unit.

References Cited in the file of this patent
UNITED STATES PATENTS

| | | |
|---|---|---|
| 376,219 | Warmington et al. | Jan. 10, 1888 |
| 627,833 | Uebel | June 27, 1899 |
| 643,009 | Searle | Feb. 6, 1900 |
| 659,274 | Williams | Oct. 9, 1900 |
| 1,038,059 | Zink | Sept. 10, 1912 |
| 1,328,048 | Knapp | Jan. 13, 1920 |
| 1,416,613 | Colardeau | May 16, 1922 |
| 2,488,187 | Haberman | Nov. 15, 1949 |

FOREIGN PATENTS

| | | |
|---|---|---|
| 38,746 | Switzerland | Jan. 10, 1907 |
| 70,066 | Switzerland | Aug. 16, 1915 |
| 295,961 | Great Britain | Aug. 20, 1928 |

OTHER REFERENCES

Poulet: (German printed application), P12266 II/63c, Jan. 5, 1956.